United States Patent [19]
Baker et al.

[11] Patent Number: 5,490,139
[45] Date of Patent: Feb. 6, 1996

[54] MOBILITY ENABLING ACCESS POINT ARCHITECTURE FOR WIRELESS ATTACHMENT TO SOURCE ROUTING NETWORKS

[75] Inventors: Murray C. Baker, Toronto, Canada; Partha P. Bhattacharya, Briarcliff Manor, N.Y.; Jeane S.-C. Chen, Ossining, N.Y.; Roger Y. M. Cheung, Scarborough, Canada; Arvind Krishna, Briarcliff Manor, N.Y.; Peter E. Reissner, Mississauga, Canada; Mahmoud Naghshineh, Fishkill, N.Y.

[73] Assignee: International Business Machines Corporation, Armonk, N.Y.

[21] Appl. No.: 314,554

[22] Filed: Sep. 28, 1994

[51] Int. Cl.[6] .............................. H04B 7/26; H04L 12/66
[52] U.S. Cl. .................. 370/60; 370/85.13; 370/94.3; 370/94.1; 370/61; 455/54.1
[58] Field of Search ............................ 370/60, 61, 16, 370/16.1, 17, 85.12, 85.13, 85.14, 85.15, 95.3, 58.1, 58.2, 58.3, 93, 94.1, 95.1, 92, 94.3; 455/9, 32.1, 53.1, 54.1, 54.2, 56.1

[56] References Cited

U.S. PATENT DOCUMENTS

| | | | |
|---|---|---|---|
| 5,305,308 | 4/1994 | English et al. | 370/60 |
| 5,339,316 | 8/1994 | Diepstraten | 370/85.13 |
| 5,363,369 | 11/1994 | Hemmady et al. | 370/85.13 |
| 5,394,391 | 2/1995 | Chen et al. | 370/60 |

*Primary Examiner*—Alpus Hsu
*Assistant Examiner*—Ricky Q. Ngo
*Attorney, Agent, or Firm*—Douglas W. Cameron

[57] ABSTRACT

A method of routing packets through a fixed source routing communications network from and to mobile units. With this invention an initial access point is determined when a communications session is established to or from a mobile unit through the network. Location information is updated each time the mobile unit moves out of the range of one access point and into the range of another access point of the network. When packets for the session are to be transmitted to the mobile unit from the wired network, the packets are forwarded from the initial access point to a current access point, which by definition is in the range of the mobile unit. When packets for the session are to be transmitted from the mobile unit and to the wired network the access point intercepts these packets and routes them to their destination and/or initiates route discovery to those destinations. When packets are to be transmitted between mobiles at different access points. The packets are sent between the current access points and not through the home access points.

4 Claims, 7 Drawing Sheets

FIG. 2
MOBILE DATABASE

| MOBILE MAC | AP MAC | TIME |
|---|---|---|
| | | |

FIG. 3
ROUTING DATABASE

| MAC | RIF | TIME |
|---|---|---|
| | | |

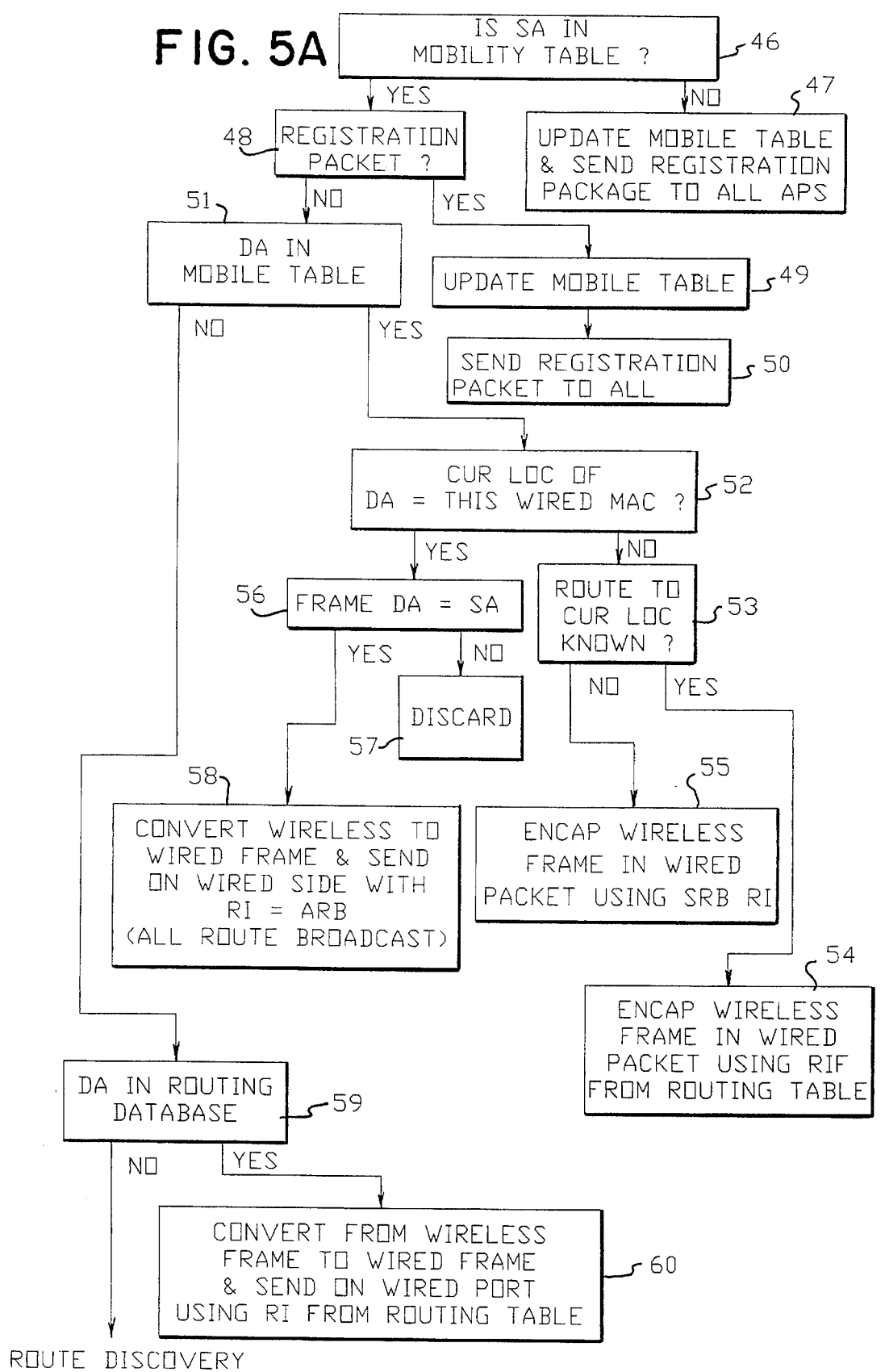

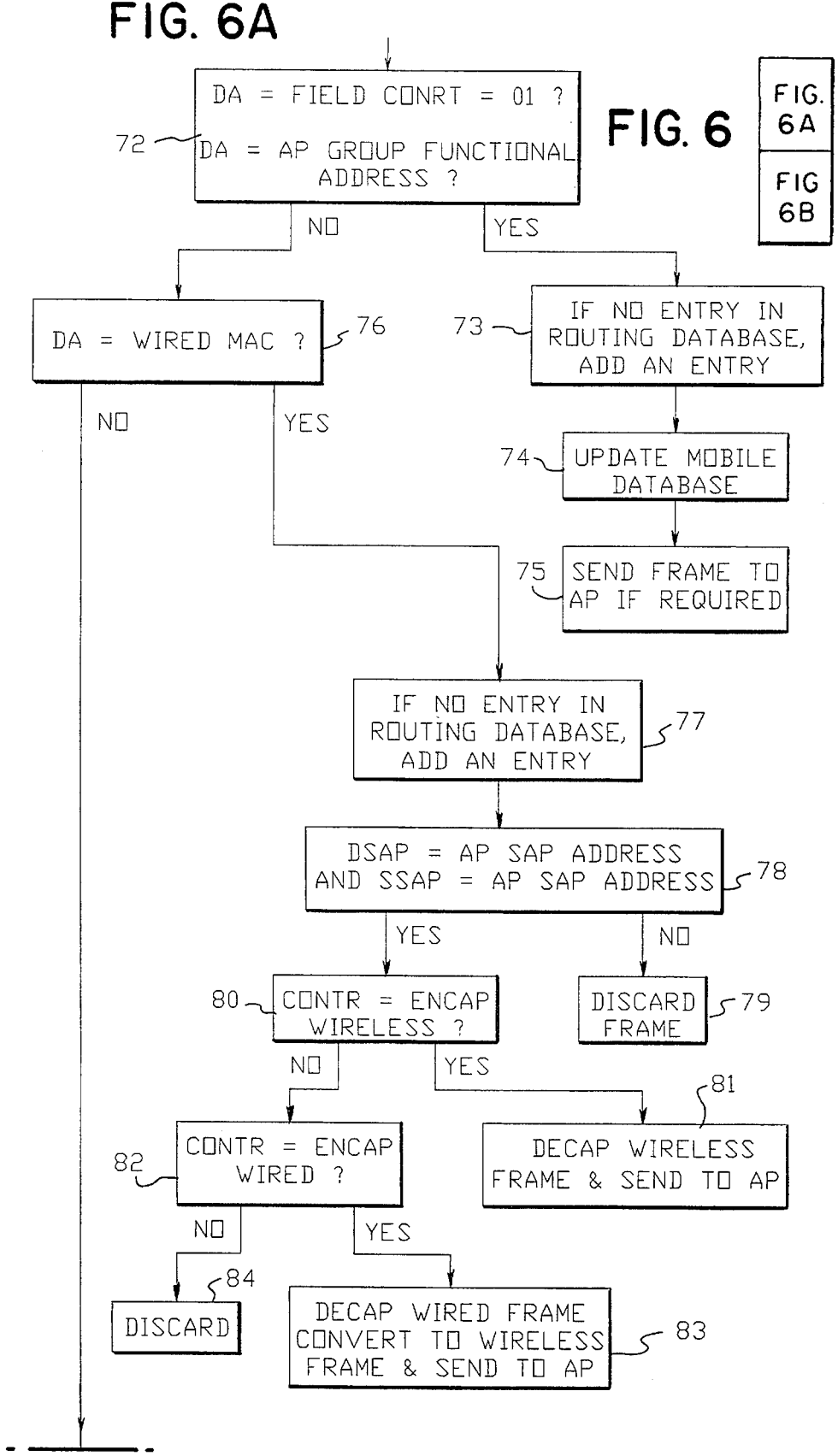

5,490,139

MOBILITY ENABLING ACCESS POINT ARCHITECTURE FOR WIRELESS ATTACHMENT TO SOURCE ROUTING NETWORKS

TECHNICAL FIELD

This invention relates to a method and apparatus for routing packets through a source routing communications network.

BACKGROUND OF THE INVENTION

One of the inherent problems introduced in communication networks supporting mobile/wireless connections is the fact that a user's access point to the wired network is not static and user movement restfits in handoff events from one access point to another. When an access point needs to be changed as a result of the movement of the mobile unit, the packets (or frames) destined to the mobile terminal need to be routed to the new access point with which the mobile user has established a connection.

Network routing requires routing (or switching) equipment and a set of rules which govern the forwarding of packets from one port of the router to another. The protocol entities that are routed through the network can be packets which belong to the network layer which is the layer three of the OSI (Open System Interconnection) reference model, or these entities can be frames which belong to the data link layer or layer two in the OSI reference model. In the latter case, the switching equipment arc often called bridges. One important and widely used routing scheme is source routing. In this scheme, the packet (or frame) contains the whole routing information in a field which is called the routing information field (RIF). Essentially, the RIF of each packet (or frame) contains the logical address of all switching points (routers or bridges) and/or the network or LAN segment ID along the route of the packet. The sequence of these addresses decline the path that each packet (or frame) takes from its entry point to the network to its final destination. There are many ways to find a path or route through the network at connection setup time. One example is the single/all route broadcast used in IBM's token ring networks which uses source routing as means of transporting packets through bridged local area network consisting of token rings and source routing bridges. Usually, a route is discovered for every destination is saved or cached in the local memory of the station, and used for every packet (or frame) that is sent to that destination. Reference [1] teaches the establishment of a route using a route discovery mechanism in a source routing network; however the reference does not deal with the situation when one of the parties is a mobile device in motion.

In a network where source routing is used, the packet (or frame) originator communicating to a mobile terminal which has completed a hand-off needs to discover a new route to the new access point and use a new set of addresses in the RIF in order to reroute its packets to the new access point. This would involve changes to the network operating system of that originator.

SUMMARY OF THE INVENTION

It is an object of this invention to provide for efficient routing of packets to/from a mobile unit through a fixed network as the the mobile unit moves within range of different access points of the network.

It is a more specific object of this invention to provide for the above routing without changing the operating systems of any stations or switching points of the network.

It is another object of this invention to provide a communications architecture to allow a mobile unit to maintain an apparent continuous communication session while the mobile unit is in motion.

With this invention, when a session to or from a mobile unit through a fixed network is established an initial or home access point is determined. All packets for the session and destined to the mobile unit from a node on the wired source routing network are forwarded from the initial access point to a current access point, which is by definition in the range of the mobile unit. Packets for the session and destined to the mobile unit from another mobile are sent between the current access points without first being routed through the home access point. Packets from a mobile destined for either wired source routing nodes or other wireless mobiles, that the current access point has determined can not be found in its wireless LAN are transmitted over the wireless backbone once the current access point has determined a route to that destination.

BRIEF DESCRIPTION OF THE DRAWINGS

FIG. 2 shows a graphical representation of an entry in the Mobile database which might be kept on the access points of FIG. 1.

FIG. 3 shows a graphical representation of an entry in the Routing database which might be kept on the access points of FIG. 1.

FIGS. 5A and 5B show a flow chart of a procedure of the present invention performed when an access point of FIG. 1 receives a frame on its wireless port.

FIGS. 6A and 6B show a flow chart of a procedure of the present invention performed when an access point of FIG. 1 receives a frame on its wired source routing port.

DESCRIPTION OF THE PREFERRED EMBODIMENT

Figure 1:
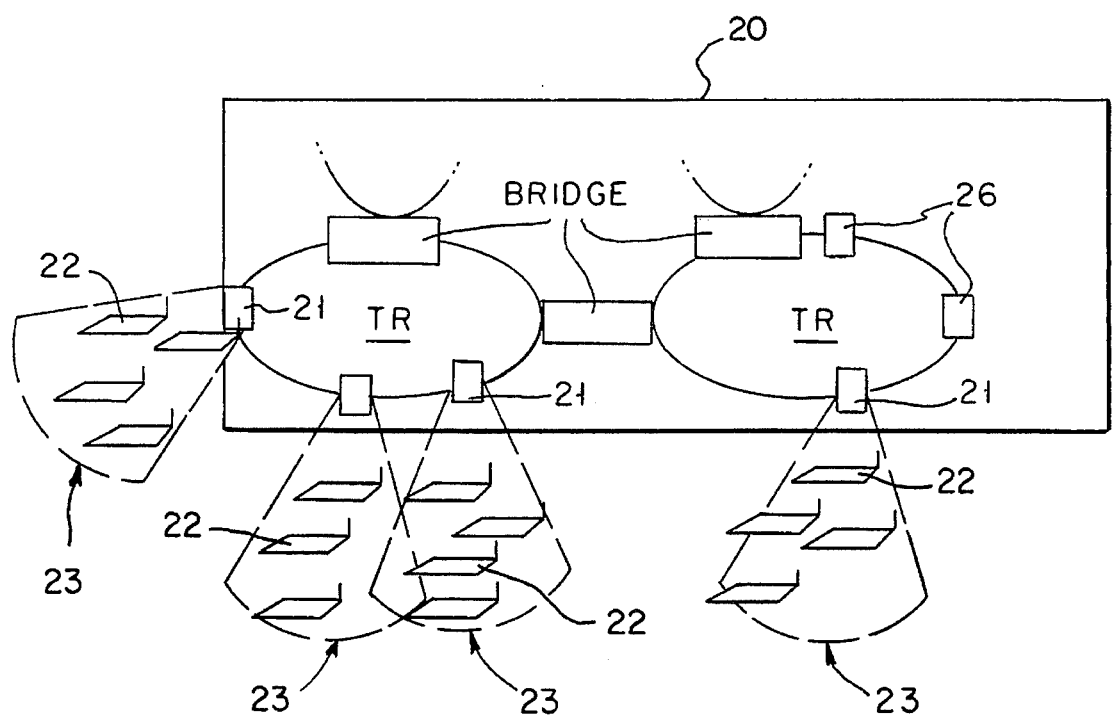
FIG. 1 shows a communication network in which the apparatus of the present invention might find use.

Referring more particularly to FIG. 1, there is a stationary Token-Ring backbone network 20 comprising access points 21, and two host computers 26. The token-ring network is an example of a source routing communications network. In the vicinity of the network, there are fifteen mobile units 22 equipped with the capability to communicate through a wireless media such as radio or infrared. Each access point 21 is also equipped with the capability to communicate through the same wireless media as used by the mobile units 22. A wireless communication range 23, is covered by an access point 21. Each of the mobile units 22 is within the coverage of at least one wireless communication range 23. When a mobile unit 22 enters a wireless communication range 23 associated with one of access points 21, it registers with the access point. Each mobile unit may only be registered with one access point at any single point in time. Each mobile unit relics on the access point 21 it registered with to communicate with either the host computers or other mobile units belonging to different wireless communication ranges.

Each of the access points 21 maintains a mobile database which keeps the current location information of all mobile units that initiated sessions with it, as well as the current location of all mobiles communicating with the mobiles registered to this access point. The mobile data base also tracts changes in the current location of any mobile units in the network. Each of the access points also maintains a routing database to track the routes to those nodes outside of its wireless communication range 23 that it needs to communicate with. Such nodes can include other access points, mobile units, and host computers directly attached to the wired backbone network 20. Also, each of these nodes is associated with a MAC (Medium Access Control) address with which it can be uniquely identified.

Each entry in the mobile database of an access point has the general form shown in FIG. 2 and includes the mobile MAC address 27 of a mobile unit which initiated sessions through it, and the access point MAC address 28 of the access point this mobile unit is currently registered with, and an expire timer 29 used to decay the table entry.

The routing database maintains the routing information for the token ring network. Each entry in the routing database has the general form shown in FIG. 3 and includes the MAC address 30 of known reachable entities and the Routing Information Field (RIF) 31 to reach them, and an expire timer 32 used to decay the table entry. The routing database serves the same purpose as the routing table kept in a token ring station.

In order to maintain the correctness of the entries in these tables, some timers and aging mechanisms have to be applied. Also, some control flows among each of access points 21 have to be generated.

Each of access points 21 acts as a relaying agent for packets to and from mobile units 22. In doing this, some encapsulation and decapsutation mechanisms are needed in order to preserve the addresses of the original source and destination. Each access point must also do any necessary frame translation if the wireless and wired networks are using different frame types. Incidents where encapsulations are needed are:

When an access point has a packet to be forwarded to a mobile unit 22 registered with other access point 21, the access point makes a token ring packet using its own token ring MAC address as the source address, and the MAC address of the access point that mobile is currently registered with as the destination address. The packet is encapsulated in the data field where the original source and destination can be found. Such a packet can come from a mobile node or a node on the wired backbone.

Decapsulation is performed when each of the access points 21 receives an encapsulated packet, and this decapsulation is used to determine the intended destination.

In token ring networks, a source routing mechanism is used to send a packet across multiple LAN segments. Source routing requires that the originating end station provides the routing information (RIF). Routes are obtained by broadcasting route discovery packets, and the obtained routes are kept in a routing table. It is undesirable to place this responsibility in the mobile stations since movement of a mobile station requires the routing tables to be subsequently updated, consequently resulting in the generation of high volume broadcasting traffic.

With token ring networks, each access point assumes the responsibility of route discovery and maintenance for all the mobile units within its wireless communication range 23. See reference [1]. Each access point and the mobile units within its range form a wireless LAN segment, which is treated as a virtual token ring end node in the context of routing. It is the responsibility of the access point to intercept frames from mobiles registered to it, if the access point determines that the intended destination can not be directly reached by the mobile. If the destination is another mobile unit, the packet should then be forwarded to the access point 21 with which the destination mobile unit is currently registered. The MAC address of the latter access point can be found in the mobile database of the former access point. The RIF to reach each of the access points is stored in the routing database. In the event the RIF for a desired MAC address cannot be found in the routing database, an access point would have to initiate a route discovery procedure. With this procedure, the access point has to know the identity of the layer 3 network protocol since different network protocols use different frames to perform route discovery. For example, if the layer 3 protocol is IP (Internet Protocol), route discovery is done by broadcasting an ARP (Address Resolution Protocol) Frame. If the layer 3 protocol is SNA (Systems Network Architecture) or NetBios, route discovery can be done by broadcasting a TEST Frame throughout the network. These discovery frames generate responses from the desired MAC which couldn't be found in the routing database. And these responses are sent to the broadcasting access point which then extracts the RIF from the responses.

Figure 4:
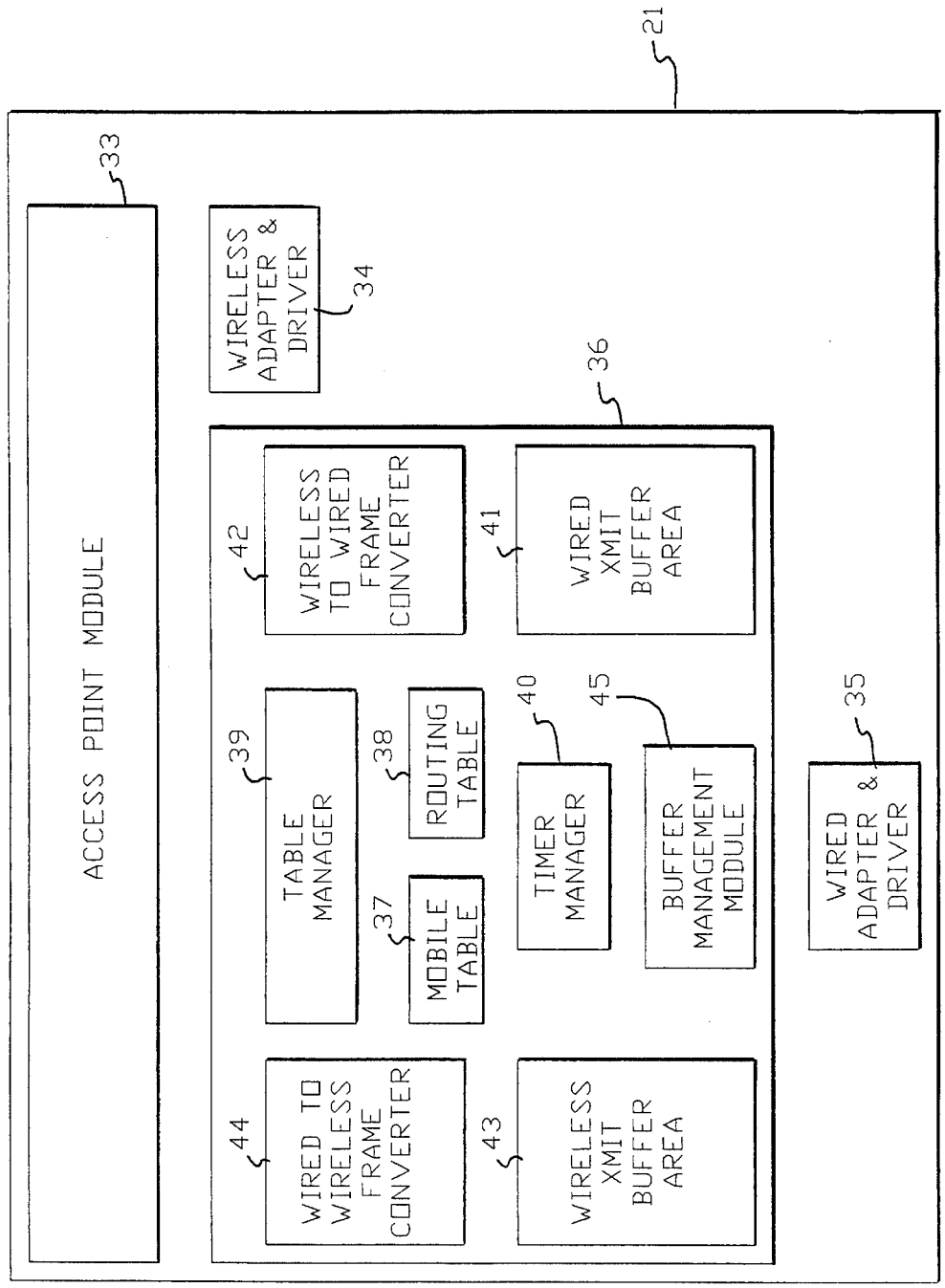
FIG. 4 shows an architectural diagram of this invention.
Figure 5B:
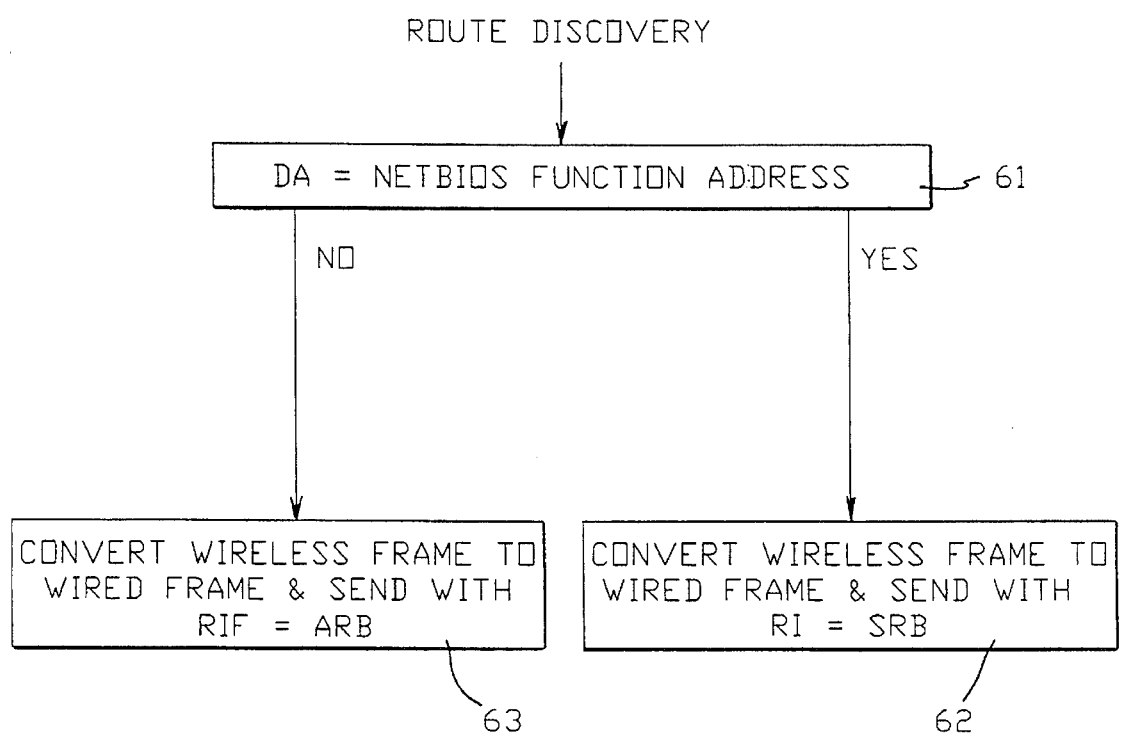
Figure 6B:
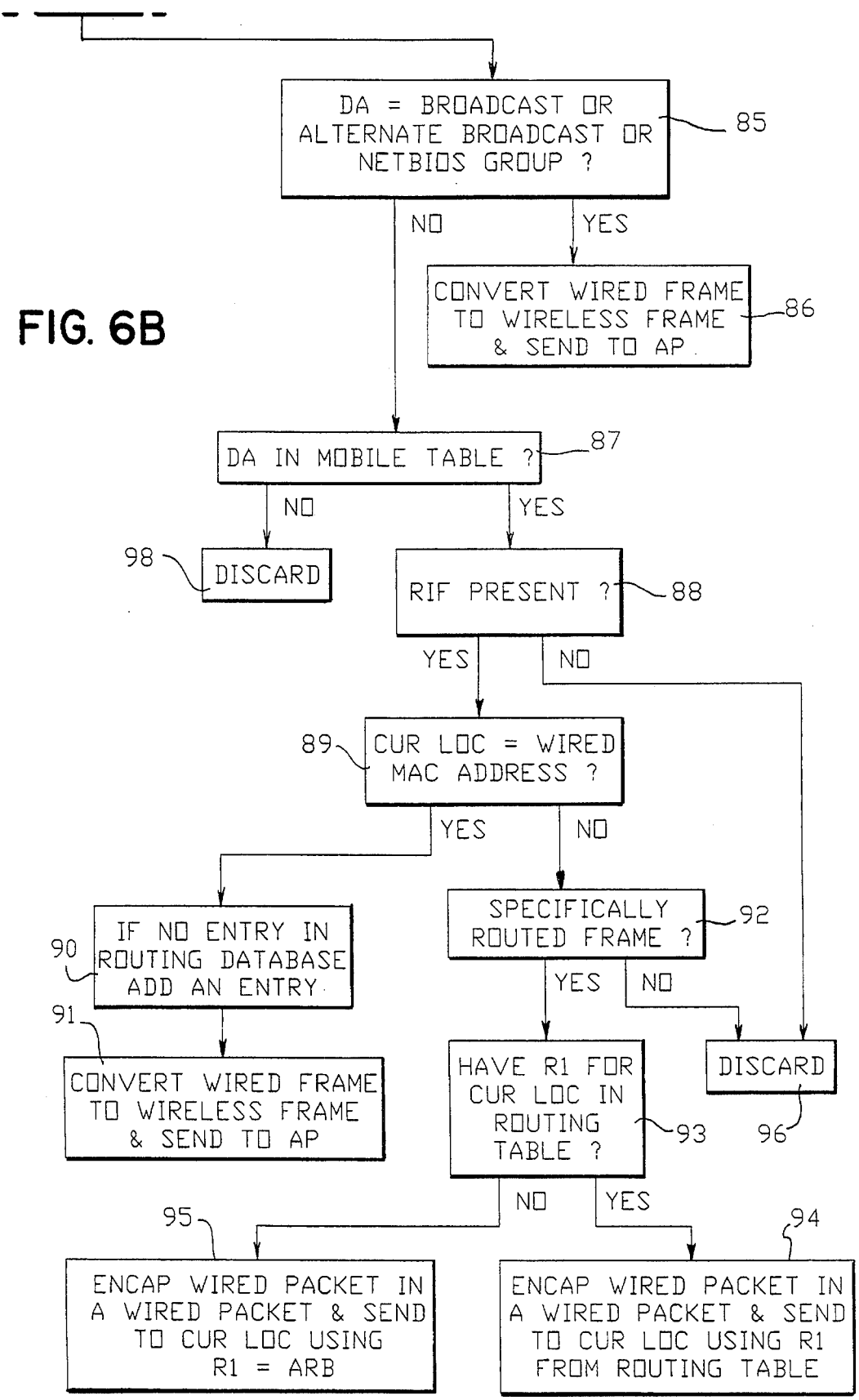

In the architecture of the current invention, it is required that each of the mobile units 22 is registered with one and only one access point 21 at any given time. Since a mobile unit can be moving around, when it enters the range of a new access point 21 and wishes to register with it, this access point 21 must communicate this new ownership with other access points 21. The information is used by each of access points to modify its mobile database, so it knows where to forward the packet if it receives any one destined for this mobile unit. For this purpose, a special address, known as the AP-GROUP-FUNC-ADDRESS is created, and a control frame is sent with this special address being the destination address. Every one of the access points 21 in the network will receive this control frame and update their databases accordingly. In FIG. 4 there is shown an architectural diagram of an access point 21. The access point module 33 performs the functions—tracking mobile nodes, buffering frames between the wireless adapter 34 and the wired adapter 35, registering mobiles, and managing access point to access point communication. It is assumed that this access point module implements a transparent bridge between its wired and wireless sides and that the wired and wireless frame types are equivalently non-source routing frames (e.g. 802.3 or ethernet frames) [2]. The access point module requires wired to wireless buffers, wireless to wired buffers, a table of registered mobile units, and the logic to make these units interact. It is the source routing mobility enabling module 36 that is the focus of this invention. This module contains the mobile database 37 and the routing database 38 which have previously been described. The table manager module 39 ensures that the entries in this table are maintained in an efficient manner. The table manager must include logic to insert, delete and update fields in the mobile and routing databases 37 and 38. To do this efficiently the table manager should perform non-linear searches (e.g. binary search) on a sorted table. The timer module 40 ages the entries in the tables and invokes the table manager module to remove expired entries. The time module needs to be interfaced to a real time tracking processor. At predefined intervals the timing processor will evoke the time module to decrement the expire counters for entries in the table manager's tables. In a PC based implementation, this would simply involve hooking into the periodic timer interrupt. Data frames that the access point module sends to the non-source routing backbone are placed in the wired transmit buffer area 41, which is implemented as a circular buffer. The wireless to wired frame converter 42 converts the packet from the wireless frame type to the source routing frame type of the backbone. In so doing the converter module consults the mobile and routing databases 37 and 38. The logic followed by this module is shown in FIG. 5. Similarly, packets that come from the source routing backbone are placed in the wireless transmit buffer area 43 and the wired to wireless frame converter 44 converts the packets from the source routing backbone frame type to the wireless node's non-source routing frame type. The logic followed by this module is shown in FIG. 6. The buffer management module 45 ensures the integrity of these circular buffers 41 and 43, by using head and tail pointers to track where flames should be received to and transmitted from. It is important to note that the frame size will change as a result of converting the frame from the source routing to non-source routing frame type. Therefore it is the responsibility of the buffer manager to ensure that the resulting frame size changes do not corrupt the head and tail pointers, or other frames in the buffer.

In FIG. 5 there is shown a detailed flow chart of operations performed by each of the access points when it receives a frame on its wireless port. In FIG. 5, at a decision box 46 a check is made to determine if the source address of the wireless packet is in the mobile database. If not (47) an entry is made in the mobile data base with the current location being this access point. As well, in 47 a frame destined to all access points on the wired network (group addressing) is transmitted so that all other access points can update their tables with this information. In decision box 48 a check is made to determine if the wireless packet is a registration packet From the access point. If this is true (49), an entry is made or updated in the mobile data base to reflect the Fact that this access point is now the current location of the mobile. A registration packet is also sent out to all the access points on the wired backbone (group addressing) to allow the other access points to update their tables 50. IF it is not a registration packet, box 51 is consulted to check if the destination of the packet is in the mobile database. If the packet destination is listed in the mobile database, a Further decision box 52 is used to check if this access point is the current location of the mobile unit. If this check fails, decision box 53 is checked to determine if a known route to the current access point of the destiled mobile is in the routing table. If the route has already been found, the wireless frame is encapsulated in a wired frame and sent to the current location access point of the mobile as a specifically routed packet—box 54. If the route is not known, then the wireless frame is encapsulated in a wired frame and sent to the current location access point of the mobile as a single route broadcast (SRB) packet—box 55. If box 52 determines that this access point is the current location of the destined mobile, then a further check is made in decision box 56 to see if the frame's DA (destination address)=SA (source address). If the DA=SA, the packet is converted from the wireless to wired format and sent as an all routes broadcast (ARB) packet—box 58. If decision box 56 reveals that the frame DA is not the same as the frame SA, then the frame is simply discarded in box 57. If it was determined that the wireless Frame destination was not in the mobile table from decision box 51, then decision box 59 is used to determine if the destination address can be found in the routing table. It is the use of the information in the routing data base that allowed for direct transmission of data from the mobile unit to the wired node without having to go through the home access point. If the DA can be found in the routing table, the wireless frame is converted to the wired frame format using the routing information from the routing table and sent to the destined node, 60. If the destination was not found in box 59, then the access point initiates route discovery on behalf of the mobile. If decision box 61 determines that the wireless frame DA is to the NETBIOS group address, then the wireless frame is converted to wireless format in box 61 and sent on the wired backbone with the RIF (Routing Information Field) set to SP, B (Single Routes Broadcast). If the wireless packet is not destined to the NETBIOS group address then box 63 is entered, and: the wireless Frame is converted to wireless format and sent out with RIF=ARB.

In FIG. 6 there is shown a detailed flow chart of operations performed by each of the access points 21 when it receives a packet on its source routing port. Box 72 is used to check if the destination address field DA equals to AP-GROUP-FUNC-ADDRESS. If the answer is yes, it is determined that the packet is a registration packet, and boxes 73–75 arc used to update the routing and the mobile databases and pass the frame up to the access point. If the DA is not AP-GROUP-FUNC-ADDRESS, then box 76 is used to check if DA equals to the access point's own source routing MAC address. If so, box 77 is used to update the routing database. In box 78, an integrity check is made to ensure that the packet is using the AP service access points (SAPS) in the logical link control protocol data unit (LPDU) of the data field. If this check fails the frame will be discarded in box 79. If either the Destination Service Access Point (DSAP) or the Source Service Access Point (SSAP) was found not to be the AP SAP in box 78, then wired frame will either be decapsulated to a wireless frame and sent to the access point (box 81), or decapsulated into another wired frame, then translated to a wireless frame and finally passed up to the access point (box 83), or discarded (box 84) dependant upon the outcome of decision boxes 80 and 82; in which the control (CONTR) field of the LPDU is examined. If it has been determine in box 76 that the DA is not the access point, then decision box 85 determines if the frame is a recognized broadcast. If so, the wired frame is converted to the wireless format in box 86 and forwarded to the access point. In box 86 a check is also made for a duplicate frame. If the frame is a duplicate, it is discarded instead of being forwarded to the access point. If the box 85 determines that the DA is not a recognized broadcast address, a Further check is made in decision box 87 to determine if the DA is in the mobile database. If this check fails, the frame will be discarded in box 98. If the mobile is found in the mobile database (from decision box 87), then box 88 determines if there is any routing information in the packet. If the packet contains routing information, decision box 89 determines if this access point is the current location of the destined mobile. If this is the case, box 90 updates the routing database if there was no previous entry for the originator of the frame. Then the frame is converted to the wireless format and passed on to the access point, 91. If this access point is not the current location of the destined mobile, decision box 92 is entered to ensure that this frame has been specifically routed to this access point. If so, decision box 93 examines the routing table to see if there is a known route to the access point which is the current location of the mobile. If there is a known route, the wired packet is encapsulated in another wired packet and specifically routed to the mobile's current location in box 94. Otherwise, the wired packet is encapsulated in another wired packet and sent to the mobile's current location as an all routes broadcast frame in box 95. If it was determined in box 92 that the frame was not specifically routed, or in box 88 that there was no routing information in the wired frame, then the frame is discarded in box 96. Although not specifically shown in FIG. 6, in all cases where there is a possibility of receiving a duplicate data frame, e.g. receiving an ARB frame, a check is made for this, and the frame is discarded, with no table information being updated.

It should also be clear to those skilled in the art that further embodiments of the present invention may be made by those skilled in the art without departing from the teachings of the present invention.

References

1. "IBM Multisegment LAN Design Guidelines," Document Number CG24-3398-01, International Support Center, Raleigh, N.C., 1990.

2. 802.3 ANSI/IEEE Standard for CSMA/CD (CARRIES SENSE MULTIPLE ACCESS/COLLISION DETECTION DESCRIBED IN ISO/IEC (International Organization for Standardization/International Electro Technical Commission) 8802-3.

Having thus described our invention, what we claim as new and desire to secure by Letters Patent is:

1. In a source routing communications network having a plurality of access points for providing wireless communications with a plurality of mobile units, a method of routing packets to and from said mobile units through said network, said method comprising:
   a. initiating a communications session by each of said mobile units;
   b. determining a home access point, of said access points, for each of said mobile units, with each said home access point being an access point of said each mobile unit when said each mobile unit initiated a communications session on said network;
   storing access point information in a number of said access points, said access point information indicating a current access point of each of said mobile units;
   d. updating current access point information stored in a number of access points whenever any one of said mobile units changes its current access point, with said updated information indicating a current access point of each of a number of said mobile units;
   e. forwarding first packets from each of said mobile units to its current access point for a communications session when said each mobile unit has said first packets to transmit;
   f. upon reception of said first packets forwarded in step (e) by a current access point, of said access points, of said each mobile unit, forwarding said first packets from latter said current access point toward a destination indicated in said first packets via a route indicated in storage of said latter current access point and corresponding to said destination, where said destination can be any one of said mobile units whose current access point is updated in step b), and where, if said one mobile unit is said destination, said first packets can be routed directly to said one mobile unit without having to be routed through a home access point of one said mobile unit; and
   g. forwarding second packets destined to said each mobile unit from said home access point of said each mobile unit to a current access point, of said access points, of said each mobile unit where latter said current access point is indicated in said updated information stored in said home access point.

2. A method as recited in claim 1, wherein said current access point information is updated by broadcasting a control packet to each of said access points each time any one of said mobile units changes its current access point, with said control packet indicating a new current access point of said one mobile unit, wherein each of said access points changes its current access point information upon reception of said control packet to indicate said new current access point of said one mobile unit.

3. A method as recited in claim 1, further comprising:
   forwarding third packets destined to said each mobile unit directly from a current access point of one of said mobile units from which said third packets originated, where said third packets are not routed through said home access point of said each mobile unit for which said third packets are destined.

4. In a source routing communications network having a plurality of access points for providing wireless communications with a plurality of mobile units, an apparatus for routing packets to and from said mobile units through said network, said apparatus comprising:
   a. means for initializing a communications session by each of said mobile units;
   b. means for determining a home access point, of said access points, for each of said mobile units, with each said home access point being an access point of said each mobile unit when said each mobile unit initiated a communications session on said network;
   c. means for storing access point information in a number of said access points, said access point information indicating a current access point of each of said mobile units;
   d. means for updating current access point information stored in a number of access points whenever any one of said mobile units changes its current access point, with said updated information indicating a current access point of each of a number of said mobile units;
   e. means for forwarding first packets from each of said mobile units to its current access point for a communications session when said each mobile unit has said first packets to transmit;
   f. means for upon reception of said first packets forwarded in step e) by a current access point, of said access points, of said each mobile unit, forwarding said first packets from latter said current access point toward a destination indicated in said first packets via a route indicated in storage of said latter current access point and corresponding to said destination, where said destination can be any one of said mobile units whose current access point is updated in step b), and where, if said one mobile unit is said destination, said first packets can be routed directly to said one mobile unit without having to be routed through a home access point of one said mobile unit; and
   g. means for forwarding second packets destined to said each mobile unit from said home access point of said each mobile unit to a current access point, of said access points, of said each mobile unit where latter said current access point is indicated in said updated information stored in said home access point.

* * * * *